June 17, 1924.
H. H. SIMMS
1,497,797
OPHTHALMIC MOUNTING
Filed June 13, 1922
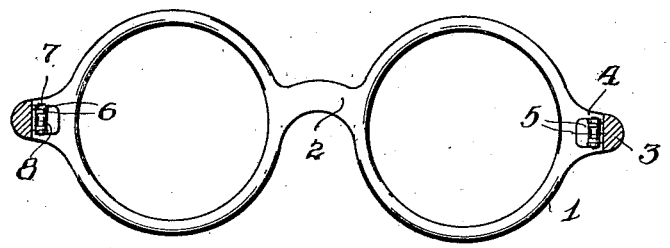
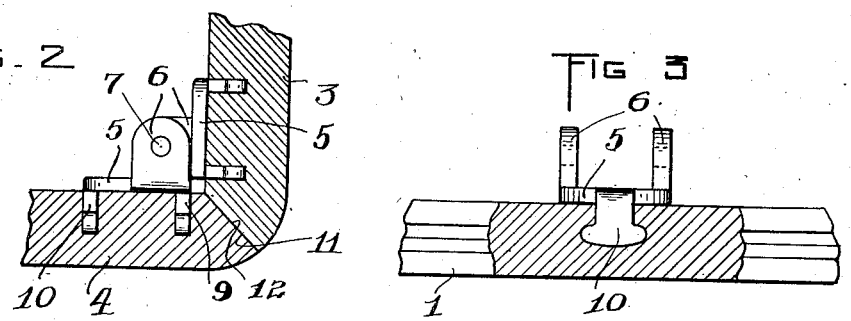
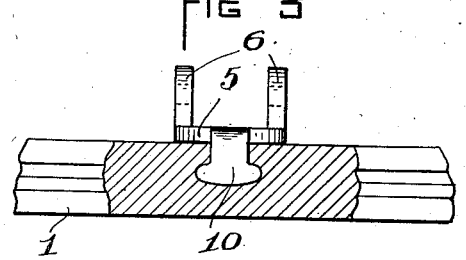
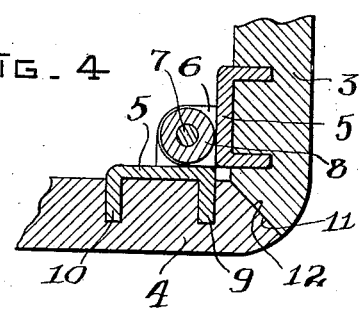
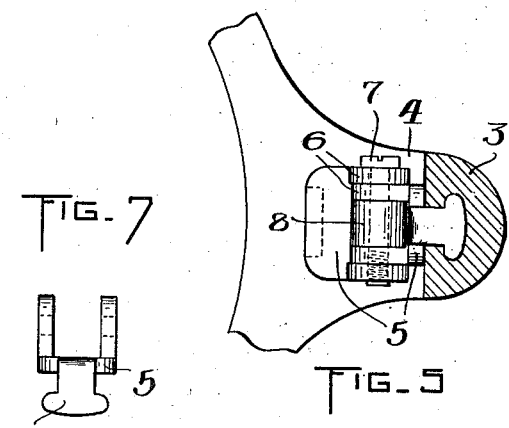
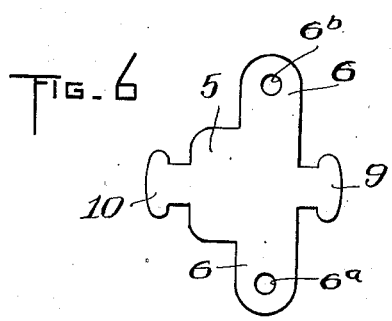
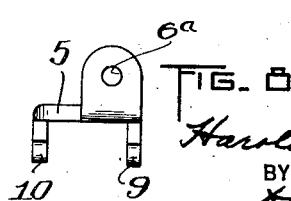
INVENTOR
Harold H Simms
BY
Davis & Sunie
his ATTORNEY Patented June 17, 1924.

1,497,797

UNITED STATES PATENT OFFICE.

HAROLD H. SIMMS, OF ROCHESTER, NEW YORK, ASSIGNOR TO SHUR-ON OPTICAL COMPANY, INC., OF ROCHESTER, NEW YORK, A CORPORATION OF NEW YORK.

OPHTHALMIC MOUNTING.

Application filed June 13, 1922. Serial No. 568,036.

*To all whom it may concern:*

Be it known that I, HAROLD H. SIMMS, a citizen of the United States, and resident of Rochester, in the county of Monroe and State of New York, have invented certain new and useful Improvements in Ophthalmic Mountings, of which the following is a specification.

The present invention relates to ophthalmic mountings and more particularly to the type in which the frame of the mounting is made of non-metallic material, such as pyroxylin. An object of this invention is to provide improved hinge connections between the temples and the frame which will dispense with separate fastening devices. A further object of the invention is to provide a hinge connection in which the hinge member has the pivot ears and anchoring means formed from a single blank of sheet material. Still another object of the invention is to provide a hinge member which has two anchoring devices, one of which is arranged close to the pivot, while the other is arranged at a point farther removed from the pivot, so that the strain on the hinge will not be transmitted to the parts in such a manner as to disconnect the hinge members from the parts to which the hinge members are secured.

To these and other ends, the invention consists of certain parts and combinations of parts, all of which will be hereinafter described; the novel features being pointed out in the appended claims.

In the drawings:

Fig. 1 is a rear view of an ophthalmic mounting, constructed in accordance with this invention, the temples being shown in section;

Fig. 2 is an enlarged fragmentary section through the frame and a temple showing the hinge connection in side elevation connected with these parts;

Fig. 3 is a fragmentary view of the member which is secured to the frame;

Fig. 4 is a view similar to Fig. 2, showing the hinge in section;

Fig. 5 is an enlarged view of the rear face of the hinge showing the temple in section;

Fig. 6 is a plan view of the blank from which the hinge members are made;

Figs. 7 and 8 are two views of the hinge member which is secured to the temple.

Referring to the embodiment of the invention herein illustrated, 1 indicates the lens rings which have, as usual, internal grooves for the reception of the lenses, the grooves and lenses not being shown. The lens rings are made of non-metallic material such as zylonite and are connected by a bridging portion 2 also formed of the same material. The lens rings 1 have on their outer sides, extensions 4 of non-metallic material to which the temples 3 are pivotally connected. Each hinge in the embodiment of the invention comprises two members, each of which is preferably formed by a member or plate 5 made from sheet metal and provided on opposite sides with ears 6 also formed from sheet metal, said ears being situated closer to one end of the member 5 than the other so that the member 5 extends outwardly from the ears. In this instance, the ears are made in one piece with the plate or member 5 and bent laterally from opposite sides of said plate. The member 5 of the temple hinge member is narrower than the member 5 on the frame hinge member, so that the ears 6 on the temple hinge member may be received between the ears 6 on the frame hinge member. One of the ears 6 of the frame hinge member is provided with a screw threaded opening 6ª and the other ears on both the temple hinge member have plain openings 6ᵇ. When the two pairs of ears are aligned, a pivot screw 7 is passed through the openings and engages the walls of openings 6ª to hold the ears together. A spacer 8 may be arranged between the ears of the hinge member on the temple, so that the screw 7 may be tightened to such an extent that a binding action between the ears of the hinge member may be obtained, so that the temple will not have too loose a movement.

In order to secure the hinge member to the temples and the frame, each hinge member has two anchoring projections 9 and 10, the anchoring projection 9 being nearer to the ears 6 than the anchoring projection 10. The projection 9 proceeds from the edge of the plate which is in a plane with one side of each of the two ears while the member 10 is farther removed from the ears, the adjacent sides of the ears being spaced from that edge of the plate 5 from which the projection 10 extends. These anchoring projections 9 and 10 are secured to the non-metallic material by heating the projections and then forcing said projections into the material. It is preferred to bevel each inner temple end at 11 to cooperate with a bevelled portion 12 on the extension 4, and the anchoring projection 9 is forced into the temple or the extension 4 as near to the bevelled portion as possible. The plate 5 then extends from this bevelled portion, so that the anchoring projection 10 is situated some distance from the pivot of the hinge. By this arrangement the plate, which cooperates with the adjacent face of the part to which it is secured, tends to strengthen such part and the strain on the anchoring projection is so distributed that the possibility of the hinge being disconnected from the non-metallic parts is reduced to a minimum. The surfaces of the plates between the ears of the hinge members which are secured to the extensions 4 of the plate, cooperate with the ears 6 of the members which are secured to the temples and limit the outward swinging of the temples, this outward movement also being limited by the bevelled surfaces 11 and 12, which are preferably so formed that they meet at the same time that the ears of the temple hinge members engage the plates 5 of the hinge members secured to the frame.

What I claim as my invention and desire to secure by Letters Patent is:

1. The combination, in an ophthalmic mounting, with a non-metallic lens frame formed with an extension at one side provided with a bevelled portion, and a temple of non-metallic material having a bevelled portion, of a hinged connection between the temple and the extension embodying two plates, one cooperating with the rear face of the extension and the other cooperating with the inner face of the temple, two ears extending from each plate, the ears of one plate being pivotally connected to the ears of the other plate and cooperating with the said other plate to limit the outward swinging movement of the temple, and projections bent from the edges of each plate, the projections on one plate being anchored in the extension and the projections on the other plate being anchored in the temple.

2. The combination, in an ophthalmic mounting, with a non-metallic lens frame having an extension of non-metallic material, and a temple of a hinged connection between the temple and the extension embodying a plate, a temple pivoted to the plate, and two anchoring projections on the plate one of which is nearer to the pivot of the hinge than the other.

3. The combination, in an ophthalmic mounting with a non-metallic lens frame having an extension, and a temple of a hinged connection between the temple and the extension embodying a plate provided with two pivot ears bent from opposite sides thereof nearer one end of the plate than the other, and two anchoring projections embedded in the metallic material and bent from the opposite ends of the plate, one of said projections being nearer the pivot ears than the other.

4. A hinge member for use in ophthalmic mounting comprising a plate, pivot ears bent from opposite sides of the plate in one direction, and anchoring projections bent from the opposite ends of the plate in the opposite direction, one of said projections being nearer to the ears than the other.

5. In an ophthalmic mounting, the combination with a non-metallic lens frame formed with an extension at one side bevelled at its end, and a temple having an inner end bevelled and formed of non-metallic material to cooperate with the bevel on the extension of the lens frame, of a hinge connection between the temple and the extension embodying two members, each having a plate portion provided with two pivot ears extending in one direction from opposite sides thereof and each having two anchoring projections extending in the opposite direction from that of the pivot ears and from opposite ends of the plate, one of said projections being nearer the ears than the other, and a pivot pin connecting the ears of the two members.

HAROLD H. SIMMS.